US009405180B2

(12) United States Patent
Bowron et al.

(10) Patent No.: US 9,405,180 B2
(45) Date of Patent: Aug. 2, 2016

(54) COLOR DEPENDENT APERTURE STOP
(71) Applicant: IMAX Corporation, Mississauga (CA)
(72) Inventors: John Bowron, Oakville (CA); Steven Charles Read, Mississauga (CA); Andrew F. Kurtz, Macedon, NY (US)
(73) Assignee: IMAX Theatres International Limited, Dublin (IE)
( * ) Notice: Subject to any disclaimer, the term of this patent is extended or adjusted under 35 U.S.C. 154(b) by 0 days.
(21) Appl. No.: 14/389,782
(22) PCT Filed: Mar. 15, 2013
(86) PCT No.: PCT/US2013/032067
§ 371 (c)(1),
(2) Date: Oct. 1, 2014
(87) PCT Pub. No.: WO2013/151747
PCT Pub. Date: Oct. 10, 2013

(65) Prior Publication Data
US 2015/0070741 A1 Mar. 12, 2015

Related U.S. Application Data
(60) Provisional application No. 61/686,318, filed on Apr. 3, 2012.

(51) Int. Cl.
*G02B 26/08* (2006.01)
*G03B 21/20* (2006.01)
(Continued)
(52) U.S. Cl.
CPC ............ *G03B 21/2093* (2013.01); *G02B 5/005* (2013.01); *G02B 5/20* (2013.01);
(Continued)
(58) Field of Classification Search
CPC ........... G02B 26/0808; G02B 26/0833; G02B 27/0018; G02B 5/005; G02B 5/20; G03B 21/008; G03B 21/005; G03B 21/206; G03B 21/2093; G03B 9/02; H04N 9/3152; H04N 5/7458; H04N 9/3105

USPC .................. 359/291, 292, 298, 224.2–224.2; 362/297
See application file for complete search history.

(56) References Cited

U.S. PATENT DOCUMENTS 4,441,791 A 4/1984 Hornbeck
4,680,579 A 7/1987 Ott
(Continued)

FOREIGN PATENT DOCUMENTS

EP 1434078 6/2004
JP 11084271 3/1999
(Continued)

OTHER PUBLICATIONS

"Using Lasers with DLP® DMD Technology", TI Tech Note TI DN 2509927, Sep. 2008.
(Continued)

*Primary Examiner* — James Phan
(74) *Attorney, Agent, or Firm* — Kilpatrick Townsend & Stockton LLP

(57) ABSTRACT

Optical systems are provided that include illumination sources, micro-mirror array optical modulators, and an optical element. The micro-mirror array optical modulators can selectively modulate light beams, redirect light by diffraction and reflection, and provide an output modulated light beam that exhibits a diffraction handedness dependent on the spectral bandwidth of the light incident thereupon. The optical element has a color dependent aperture that defines portions of output modulated light beams that are transmitted and remaining portions that are blocked. An efficiency and contrast of each the output modulated light beams acquired by the optical element can be independently determined by a narrow spectral bandwidth of each of the light beams, the spectral characteristics of the color dependent aperture, and the diffraction handedness of the micro-mirror array optical modulators for the associated spectral bandwidth.

27 Claims, 14 Drawing Sheets

(51) Int. Cl.
- *G02B 5/00* (2006.01)
- *G02B 27/00* (2006.01)
- *H04N 9/31* (2006.01)
- *G03B 9/02* (2006.01)
- *G03B 21/00* (2006.01)
- *G02B 5/20* (2006.01)

(52) U.S. Cl.
CPC ....... *G02B 26/0808* (2013.01); *G02B 26/0833* (2013.01); *G02B 27/0018* (2013.01); *G03B 9/02* (2013.01); *G03B 21/005* (2013.01); *G03B 21/008* (2013.01); *G03B 21/206* (2013.01); *H04N 9/3152* (2013.01); *H04N 9/3161* (2013.01)

(56) References Cited

U.S. PATENT DOCUMENTS

| | | |
|---|---|---|
| 5,192,946 A | 3/1993 | Thompson et al. |
| 5,535,047 A | 7/1996 | Hornbeck |
| 5,552,922 A | 9/1996 | Magarill |
| 5,600,383 A | 2/1997 | Hornbeck |
| 5,982,553 A | 11/1999 | Bloom et al. |
| 6,089,717 A | 7/2000 | Iwai |
| 6,154,259 A | 11/2000 | Hargis et al. |
| 7,008,065 B2 | 3/2006 | English, Jr. et al. |
| 7,321,473 B2 | 1/2008 | Liu |
| 7,400,458 B2 | 7/2008 | Farr |
| 7,926,951 B2 | 4/2011 | Bietry et al. |
| 8,342,690 B2 | 1/2013 | Coleman et al. |
| 2002/0126264 A1 | 9/2002 | Dewald et al. |
| 2003/0091279 A1 | 5/2003 | Dho |
| 2005/0140933 A1 | 6/2005 | Cannon et al. |
| 2006/0227069 A1 | 10/2006 | Baselmans et al. |
| 2007/0014114 A1* | 1/2007 | Barazza ............ G02B 27/1026 362/297 |
| 2009/0161193 A1 | 6/2009 | Maeda et al. |
| 2012/0038892 A1 | 2/2012 | Kurtz et al. |

FOREIGN PATENT DOCUMENTS

| | | |
|---|---|---|
| WO | 2006035279 | 4/2006 |
| WO | 2013151747 | 10/2013 |
| WO | 2014142967 | 9/2014 |

OTHER PUBLICATIONS

Bottema, "Echelle Efficiency and Blaze Characteristics", SPIE Proc., vol. 240, 1980, pp. 171-176.

Dewald et al., "46.1: Invited Paper: Advances in Contrast Enhancement for DLP Projection Displays", 2002, SID International Symposium, May 21, 2002, pp. 1246-1248.

Dewald et al., "Optical Model of DMD Device in DLPa Projection System", IDW, LAD2—1 Invited, Jan. 1, 2003, pp. 1557-1560.

PCT/US2013/032067, "International Search Report & Written Opinion", Jul. 8, 2013, 14 pages.

PCT/US2013/032088, "International Search Report & Written Opinion", Oct. 30, 2013, 16 pages.

Rice et al., "DMD Diffraction Measurements to Support Design of Projectors for Test and Evaluation of Multispectral and Hyperspectral Imaging Sensors", Published in the SPIE Proc., vol. 7210, 2009.

Ryoo et al., "Analysis of the Effective Reflectance of Digital Micromirror Devices and Process Parameters for Maskless Photolithography", Paper, Microelectronic Engineering, vol. 88, 2011.

Silverstein, "A Laser-Based Digital Cinema Projector", A Laser-Based Digital Cinema Projector, 2011, pp. 326-329.

Zheng et al., "Laser Digital Cinema Projector", Journal of Display Technology, vol. 4, No. 3, Sep. 2008, pp. 314-318.

* cited by examiner

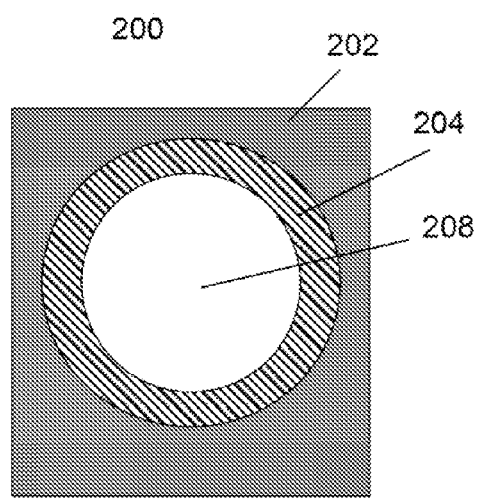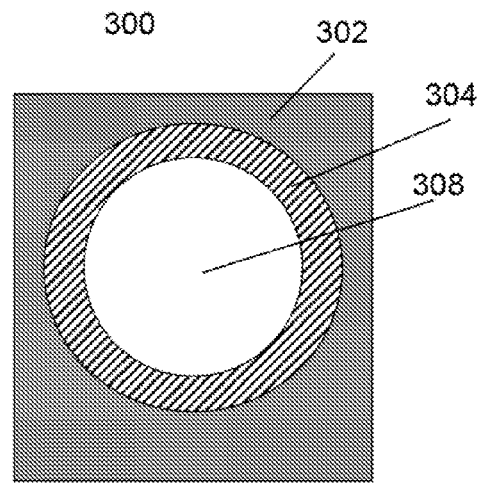
FIG. 2
FIG. 3

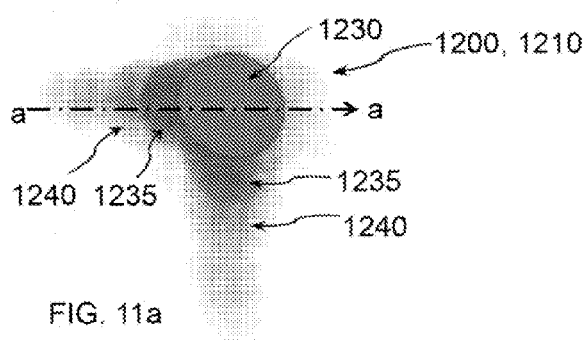
FIG. 11a
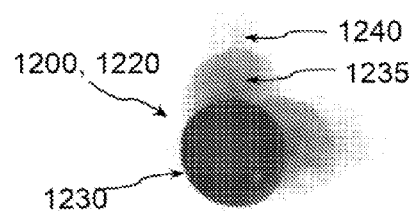
FIG. 11b
FIG. 12a
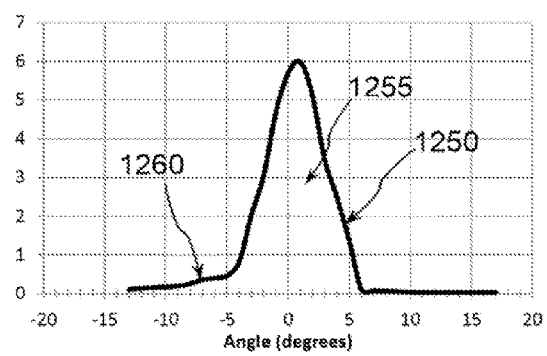
FIG. 12b
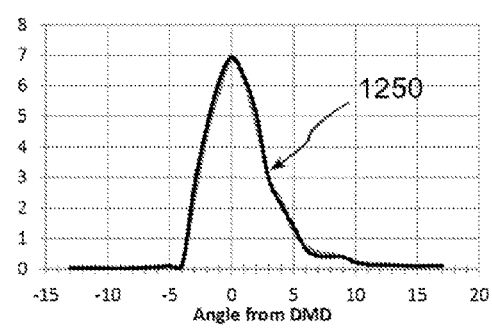

COLOR DEPENDENT APERTURE STOP

This is a U.S. national phase under 35 U.S.C. 371 of International Patent Application No. PCT/US2013/032067, titled "Color Dependent Aperture Stop" and filed Mar. 15, 2013, which claims benefit of priority under PCT Article 8 of U.S. Provisional Application No. 61/686,318, filed Apr. 3, 2012, each of which is incorporated herein by reference in its entirety.

The present disclosure is related to International Patent Application No. PCT/US2013/032088, titled "Projector Optimized for Modulator Diffraction Effects" and filed Mar. 15, 2013.

TECHNICAL FIELD

This disclosure relates generally to systems and methods usable for cinematic displays and more particularly (although not necessarily exclusively) to a projection lens having an aperture stop size and shape and an illumination system having an aperture stop size and shape, in which both or either may vary in size and or shape as a function of wavelength.

BACKGROUND

In optical design, one optical system may be followed by another optical system. In this situation it can be important to efficiently couple light from one to the other. This can be accomplished by, for example, using three considerations.

First, the working f-number for light exiting the first system can be matched to the working f-number for light entering the second system, which can help allow an axial bundle of light to be coupled efficiently. Efficient coupling may relate to cost and light throughput. If a first system has a small f-number and a second system has a larger f-number, then some light may be lost by joining these together. If a first system has a large f-number and the second system has a lower f-number, then no, or substantially no, light is lost but the second system is "too expensive" because it is overdesigned to work at a larger aperture size. Thus, one way is to match the two systems. A second condition for optimizing efficient coupling of light between optical sub-systems is to ensure that the location of the exit pupil of the first system can be the same as the location of the entrance pupil for the second system, which can help off-axis bundles of light to be coupled efficiently. Lastly, any vignetting that is done in the first system can be matched by similar vignetting in the second system. Vignetting can be used to change the effective f-number as a function of field position. Assuming that pupil locations and vignetting are details that are taken care of in the optical design and assuming the system has circular symmetry then any one of, working f-number, NA, cone angle or f-number (at infinite conjugate) can be used as the matching criteria.

When the aperture stop is no longer circular (e.g., when pupil masking is used), the previous terms are no longer constants but vary as a function of an angle. However there still exists a maximum radius at some angle that corresponds to a maximum cone angle and NA and a minimum working f-number or f-number. The optics can be designed to work under this condition and so the same matching criteria can be used as before. However, one additional condition may be imposed that is the shape and orientation of the exit pupil of the first system matches the shape and orientation of the entrance pupil of the second system.

Often the principle of matching working F-number is used in the design of the projection and illumination optics in projectors. In particular, this is used in DLP cinema projectors, which use the digital micromirror device (DMD) provided by Texas Instruments Inc. of Dallas, Tex. DMD spatial light modulators have been successfully employed in digital projection systems, including digital cinema devices that meet the DC2K digital cinema resolution standard. Efficiency measurements have been performed on such systems that use the DC2K chip and have found the efficiency optimizing principles to be valid; however, for systems utilizing the new DC4K chip the principle was not found to work as well.

Separate from the development of digital projection technology, including DMD and LCOS based projectors, laser projection technology has been evolving on a largely independent path, paced by the development of the lasers. One example is the system described in the paper "*Laser Digital Cinema Projector*," by G. Zheng et al., Journal of Display Technology, Vol. 4, pp. 314-318 (2008), which retrofits lasers into a conventional 2K DMD based digital cinema projector. A second exemplary system, described in "*A Laser-Based Digital Cinema Projector*", by B. Silverstein et al. (SID Symposium Digest, Vol. 42, pp. 326-329, 2011), describes a laser projector using 2K DMD spatial light modulators and custom optics.

In support of the development of laser projectors, transmission experiments were performed using red, green, and blue lasers. Unacceptable efficiency losses were observed with various combinations of laser wavelengths and 4K DMD devices. These losses may be due to increased diffraction from the finer pitch of the DC4K chip. Diffraction occurs when propagating waves (e.g. light waves) encounter an obstacle and its behavior is modified. This can happen, for example, when the size of the obstacle is similar to the wavelength of the wave and when the obstacle includes multiple, closely-spaced openings. This can also result in a complex spreading of the distribution of light not predicted from geometrical optics.

To improve the transmission of the red light, the size of the projection aperture stop may be increased. However, opening the projection stop can have the undesirable effect of lowering sequential contrast ratio. Sequential contrast ratio is the value obtained by measuring the brightness at a spot of a full white image divided by the brightness at the same spot of a full back image. The significant gain in red transmission may be more desirable than the modest decline in red contrast ratio. Since the aperture sizes are already correct for blue and green light, opening the projection aperture may result in a decrease in blue and green contrast. This can be undesirable especially since the majority of the luminous flux is in the green channel. Thus, there is a need for a color dependent aperture to maximize red transmission but at the same time not decrease contrast for green and blue light.

U.S. Pat. No. 7,400,458 to M. Farr provides a projection system having "wavelength dependent aperture stops" in the illumination sub-system, in which patterned thin film coatings are provided on a substrate. The resulting concentric ring spectrally dependent aperture stops modify color channel light levels and improve image quality. U.S. Pat. No. 7,321,473 to C. Liu provides a projection lens having a lens aperture where spectral filters provide concentric ring spectrally dependent apertures for the purpose of improving image resolution on a color dependent basis. Similarly, U.S. Pat. No. 7,008,065 to R. English et al. provides color balancing aperture stops or apodizing aperture stops in either the illumination system or projection optics. In this case, both concentric ring spectrally dependent apertures and shaped aperture stops designs are used, with the goal of improving illumination light levels for color balance tuning and setting white point, as well as improving image contrast from an LCOS light valve.

Although projectors, including digital cinema projectors, using the digital micro-mirror devices from Texas Instruments are in commercial use, it has not been widely recognized that the diffraction behavior of the DMD devices has changed as the features have become smaller. As such devices are used with narrow band light sources, including lasers, diffraction effects will become increasingly important and it is no longer sufficient to treat these micro-mirrors as simple reflective devices. Therefore, an opportunity remains to further improve the design of projectors using micro-mirror array modulators such as the DMD devices, including through the use of optimized color dependent apertures.

SUMMARY

In one aspect, an optical system is provided that includes a first illumination source, a second illumination source, a first micro-mirror array optical modulator, a second micro-mirror array optical modulator, and an optical element. The first illumination source can provide a first light beam that has a first spectral bandwidth. The second illumination source can provide a second light beam that has a second spectral bandwidth. The first micro-mirror array optical modulator can selectively modulate the first light beam to encode data on the first light beam. The second micro-mirror array optical modulator can selectively modulate the second light beam to encode data on the second light beam. Each of the first micro-mirror array optical modulator and the second micro-micro array optical modulator can redirect light by both diffraction and reflection, and can provide an output modulated light beam that exhibits a diffraction handedness dependent on the spectral bandwidth of the light incident thereupon. The optical element can collect the output modulated light beams from the first micro-mirror array optical modulator and the second micro-mirror array optical modulator. The optical element has at least one color dependent aperture that defines portions of the output modulated light beams which are transmitted and remaining portions which are blocked. An efficiency and contrast of each the output modulated light beams acquired by the optical element can be independently determined by a narrow spectral bandwidth of each of the first light beam and the second light beam, the spectral characteristics of the color dependent aperture, and the diffraction handedness of each of the first micro-mirror array optical modulator and the second micro-mirror array optical modulator for the associated spectral bandwidth.

In another aspect, an optical system is provided that includes a first illumination source, a second illumination source, a micro-mirror array optical modulator, and an optical element. The first illumination source can provide a first light beam that has a first spectral bandwidth. The second illumination source can provide a second light beam that has a second spectral bandwidth. The micro-mirror array optical modulator can time sequentially receive the first light beam and the second light beam, and can selectively modulate each of the first light beam and the second light beam to encode data thereon. The micro-mirror array optical modulator can redirect the first light beam or the second light beam by diffraction and reflection to provide a first output modulated light beam and a second output modulated light beam that respectively exhibit a first diffraction handedness dependent upon the first spectral bandwidth and a second diffraction handedness dependent upon the second spectral bandwidth. The optical element can collect the first output modulated light beam and the second modulated light beam of the first spectral bandwidth and the second spectral bandwidth from the micro-mirror array optical modulator. The optical element has at least one color dependent aperture that defines portions of the first output modulated light beam and the second output modulated light beam which are transmitted and remaining portions which are blocked. An efficiency and contrast of each the first output modulated light beam and the second output modulated light beam acquired by the optical element can be independently determined by the spectral bandwidth of each of the first light beam and the second light beam, the spectral characteristics of the color dependent aperture, and the diffraction handedness of the micro-mirror array optical modulator for the associated first and second spectral bandwidth.

In another aspect, an optical system is provided that includes a first illumination source, a second illumination source, a first micro-mirror array optical modulator, a second micro-mirror array optical modulator, and an optical element with a color dependent aperture. The first illumination source can provide a first light beam having a first spectral bandwidth. The second illumination source can provide a second light beam having a second spectral bandwidth. The first micro-mirror array optical modulator can selectively modulate a first incident light beam of light to encode data thereon based on commands to an ON-state or an OFF-state of one or more micro-mirrors exhibiting a diffraction handedness. The second micro-mirror array optical modulator can selectively modulate a second incident light beam of light to encode data thereon based on commands to the ON-state or the OFF-state of one or more micro-mirrors exhibiting a diffraction handedness. The color dependent aperture can receive an output modulated light beam from the first micro-mirror array optical modulator and an output modulated light beam from the second micro-mirror array optical modulator, and provide a lower f number for the first light beam than the second light beam. The first micro-mirror array optical modulator is selected to provide the diffraction handedness that prioritizes ON-state light efficiency for the first beam of light and the second micro-mirror array optical modulator is selected to have the diffraction handedness that prioritizes OFF-state optical contrast for the second beam of light.

These illustrative aspects are mentioned not to limit or define the disclosure, but to provide examples to aid understanding thereof. Additional aspects and features are discussed in the Detailed Description, and further description is provided. Advantages offered by one or more of the various aspects and features may be further understood by examining this specification or by practicing one or more aspects and features presented.

BRIEF DESCRIPTION OF DRAWINGS

FIG. 2 is a diagram of a CDA having a decreased working f-number for a certain band of wavelengths according to one feature.

FIG. 3 is a diagram of a CDA having an increased working f-number for a certain band of wavelengths according to one feature.

FIGS. 11a-f depict close up images of on-state diffraction patterns from a micro-mirror array device according to one feature.

FIGS. 12a-f depict close up images of cross-sectional profiles of on-state diffraction patterns from a micro-mirror array device according to one feature.

DETAILED DESCRIPTION

Figure 1:
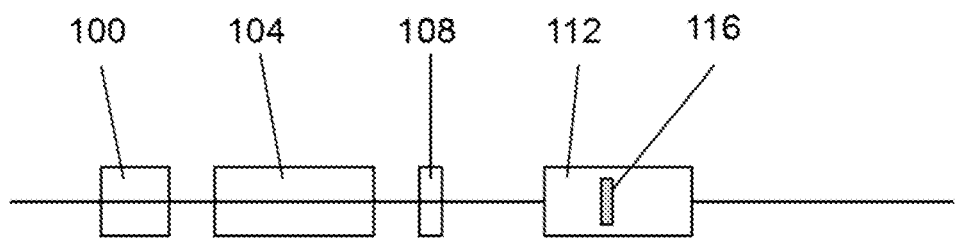
FIG. 1 is a block diagram of a system in which a CDA may be used according to one feature.

FIG. 1 is a block diagram representing one example of an optical system that may benefit from the use of a CDA. Light source 100 can have more than one wavelength. Illumination system 104 can deliver light to form a uniform patch onto a component 108 that may be a spatial light modulator (SLM), for example, in a projection system. The component 108 can change the angular distribution (i.e., the working f-number) for at least one band of wavelengths of light used by the optical system. The working f-number of the projection optic 112 may no longer match the working f-number of the illumination system 104 for all bands of wavelengths of light. A CDA 116 can be configured in the projection lens to cause the working f-number of the projection optic to match each of the different angular distributions of the bands of light received from component 108.

FIG. 2 shows a CDA 200 configured to create a smaller working f-number of an optic device for red light relative to the other bands of light. The CDA can be built on a thin transparent substrate, where region 202 is opaque, region 204 is a red transmitting filter and region 208 is clear. Blue and green light can be transmitted through region 208, but either can be absorbed or reflected depending upon the type of filter material or materials used in region 204. As another example, red light can be transmitted through both regions 208 and 204. Using region 204 to allow more red light to be transmitted can cause the optic device to have a smaller working f-number for red light. Also, region 208 can be configured so that no substrate is present in this region to allow for higher transmission.

FIG. 3 shows a CDA 300 configured to create a larger working f-number for an optic device for red light relative to the other bands of light, the opposite effect on the optic device that CDA 200 had for red light. Region 302 is opaque, region 304 is a cyan filter, and region 308 is clear or the substrate has been cut out. Cyan is complementary to red, such as being spectrally complementary such that a color plus its complement additively produces white. The cyan filter in region 304 can block red light but allow blue and green light to be transmitted through this region. Blue and green light can be transmitted through regions 308 and 304. Red light can be transmitted through region 308 only. The filter can absorb the red light, which can help maintain high system contrast. However, the filter and surrounding area may become thermally stressed. The filter can reflect the red light, which can resolve the heat problem but the reflected light may reduce system contrast. Again, red light is only used as an example. For any band(s) of wavelengths of light, the region 304 can have the complimentary filter.

Figure 4:
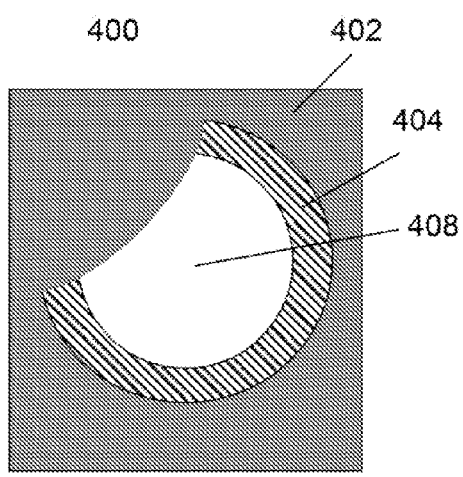
FIG. 4 is a diagram of a CDA that is non-circular according to one feature.

Non-circular pupils can be used in DLP projectors. FIG. 4 illustrates a non-circular pupil that can be a non-circular CDA 400. In making a CDA or a non-circular CDA, a transparent substrate can be masked to create any shape of CDA. One shape can be created by covering regions 404 and 408 with a mask and depositing an absorbing layer. The absorbing layer can adhere to the portion of the transparent substrate 402 not covered by the mask. By removing the portion of the mask covering region 404 (mask covering portion 408 remains) and depositing a filter coating on region 404, the portion of the CDA can be created, which can have a smaller working f-number than region 408 for the band of light that the deposited filter coating allows to be transmitted. An anti-reflection coating can be applied to all or certain regions. For example the anti-reflective coating can be applied to region 408, but not region 404, by removing the mask from region 408 and re-masking the region 404 and applying the anti-reflection coating. The remaining mask or masks can be removed and the CDA is configured to be used.

Figure 5A:
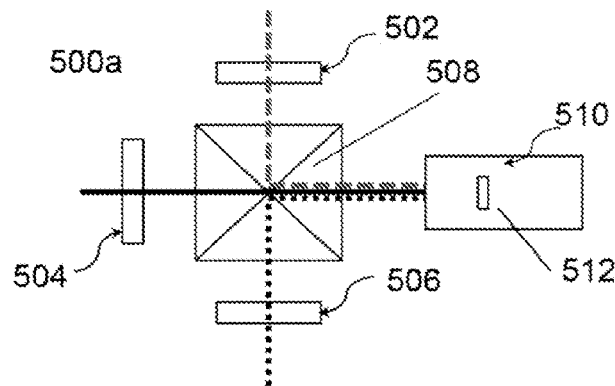
FIGS. 5A-B are block diagrams systems for realizing different working f-number for different colors by using three projection lenses according to certain features.

FIG. 5A shows a system 500a that can image modulate three color bands of wavelengths of light in which one or more bands of light have a different angular distribution when received by one projection lens 510 with a CDA 512 configured to have a working f-number to match the angular distribution of each color band of wavelength of light when projecting each color image. Red light can traverse through an SLM 502 that image modulates red light. Green light can traverse through an SLM 504 that image modulates green light. Blue light can traverse through an SLM 506 that image modulates blue light. The three imaged color bands of light can be combined using a color combiner 508. The three imaged color bands of light can be projected by a projection lens 510. The projection lens 510 has a CDA 512 that can have a different working f-number for one, or each, color band of wavelength of imaged light.

System 500B is a system that can image modulate three color bands of wavelength of light in which one or more bands of light has a different angular distribution when received by a projection lens associated with each color band of wavelength of light where each lens can have a working f-number to match the angular distribution of the color band of wavelength of light being received and projected without using a CDA or a CDA configured to match only one color band of wavelength of light. No color combiner is used in system 500B. Lens 514 can project red imaged light and can have a working f-number based on aperture 520. Lens 516 can project green light and can have a working f-number based on aperture 522. Lens 518 can project blue light and can have a working f-number based on aperture 524. The apertures 520, 522 and 524 can be different and allow different working f-number to be used for different bands of wavelengths of light. However, there may be disadvantages as compared to using a CDA configured to match more than one color band of wavelength of light. First, cost is increased because three projection lenses are used instead of one and projection lenses are usually a high cost item. Second, there are three different projection points instead of one and this can cause image registration problems especially on curved screens. Another registration problem can be apparent when trying to match the magnification of all three projection lenses. Unless the two or three of the projection lenses have zoom capability, achieving image registration between each projected color image would be very difficult. If there is still a working f-number variation within the red, green or blue bands of wavelengths of light, a CDA may be needed to correct the variation.

Working f-number can be defined by the following equation:

$$\text{working\_f\_number} = \frac{1}{2*NA}, \quad NA = n*\sin(\theta)$$

Where: NA is numerical aperture, n is the refractive index of the material, and θ is the half angle of the cone of light.

Working f-number, NA and the cone angle can be interchangeable for the concept for matching one optical system to another optical system. Other terms used include f-number or f-stop. The physical component that determines the value of the working f-number is the aperture stop diameter. For an object located an infinite distance away in a camera system:

$$\text{f\_number} = \frac{f}{EPD}, \quad \tan(\theta) = \frac{EPD}{2f}$$

Where: f is the focal length of the optical system and EPD is the entrance pupil diameter. The EPD is the size of the aperture stop as viewed from the end of the optic that is receiving light.

Figure 6:
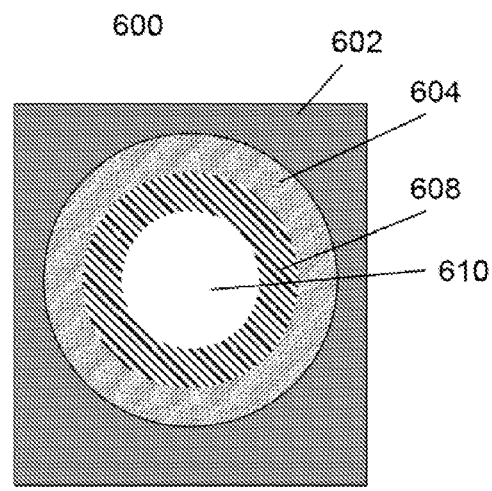
FIG. 6 is a diagram of a CDA having different a working f-number for three bands of wavelengths according to one feature.

FIG. 6 shows a CDA 600 that can have a working f-number to match three bands of wavelengths of light. CDA 600 has three regions with different transmission spectral characteristics. Region 602 can be opaque. Region 604 can transmit red light only. Region 608 can transmit green and red light and region 610 can transmit all colors of light. Thus, red light can traverse through regions 604, 608, 610 and can have the smallest working f-number. Green light can traverse through regions 608, 610 and can have a larger working f-number. Blue light can traverse through region 610 and can have the largest working f-number. The number of regions can be increased, if necessary and is only limited by cost and process considerations. Consider a light source that has a continuous distribution of wavelengths, such as a Xenon arc lamp. The working f-number can also vary continuously from the shortest wavelength to the longest. This variation can be approximated by step functions where increasing the number of step functions improves the approximation. Then each step function can be represented by a region of a CDA where the diameter of the region is related to the working f-number and the spectral filter function of the region is related to the band of wavelengths corresponding to that working f-number.

Figures 7, 15A:
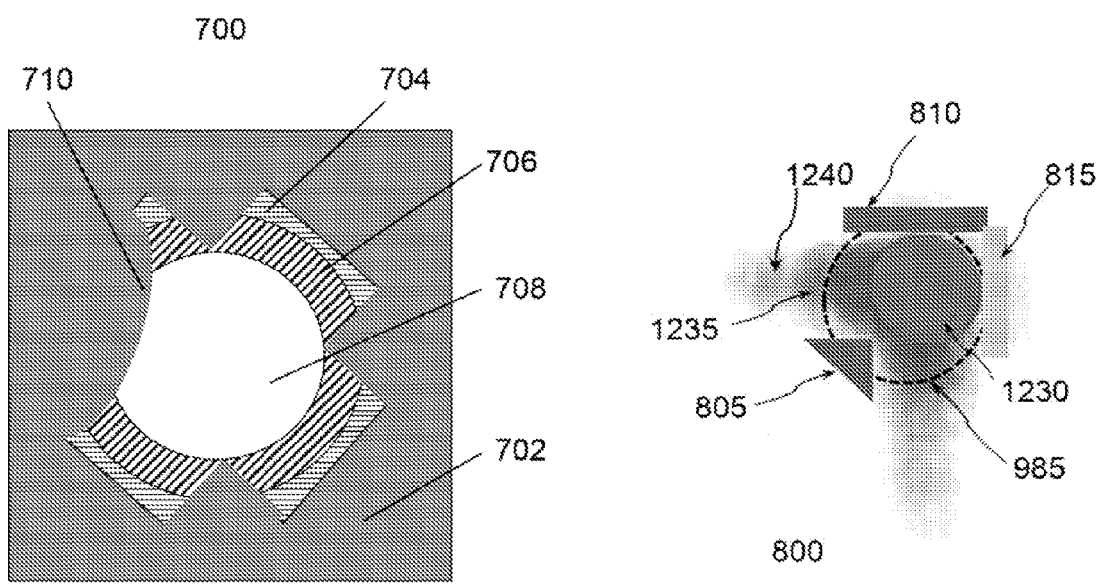
FIG. 7 is a diagram of a CDA with a complex shape according to one feature.
FIGS. 15a-b depict examples of a color dependent aperture used in conjunction with diffracted light from a micro-mirror array device according to certain features.

FIG. 7 shows an example of CDA 700 that can be a complex shape. Region 704 is shown for reference purposes and represents a diffraction pattern of a first band of wavelengths of light at the plane of the pupil. In general, the diffraction pattern can have a complex shape. The diffraction pattern can be calculated using Optical analysis software such as ASAP (Advanced System Analysis Program), light tools etc., or measured. Region 706 shows how most but not all of the diffracted light may be admitted using a filter to transmit a first band of wavelengths of light. How much diffracted light to admit can be selected by a designer, depending upon the trade-off between brightness and contrast. An annular approximation with cut outs is shown but other shapes can be used. Region 708 shows the area where light has been diffracted to a much lesser extent and a broad band anti-reflective (AR) coating is applied to allow the available wavelengths to be transmitted. An additional cut out is shown at 710. This can remove both diffracted and un-diffracted light of all transmitted wavelengths. Light corresponding to these directions may produce an unacceptable drop in contrast. The construction of the CDA 700 can be performed using a similar technique as that described for CDA 400. In this example, both the size and shape of the aperture are different depending upon the wavelength of light going through it.

Figure 8:
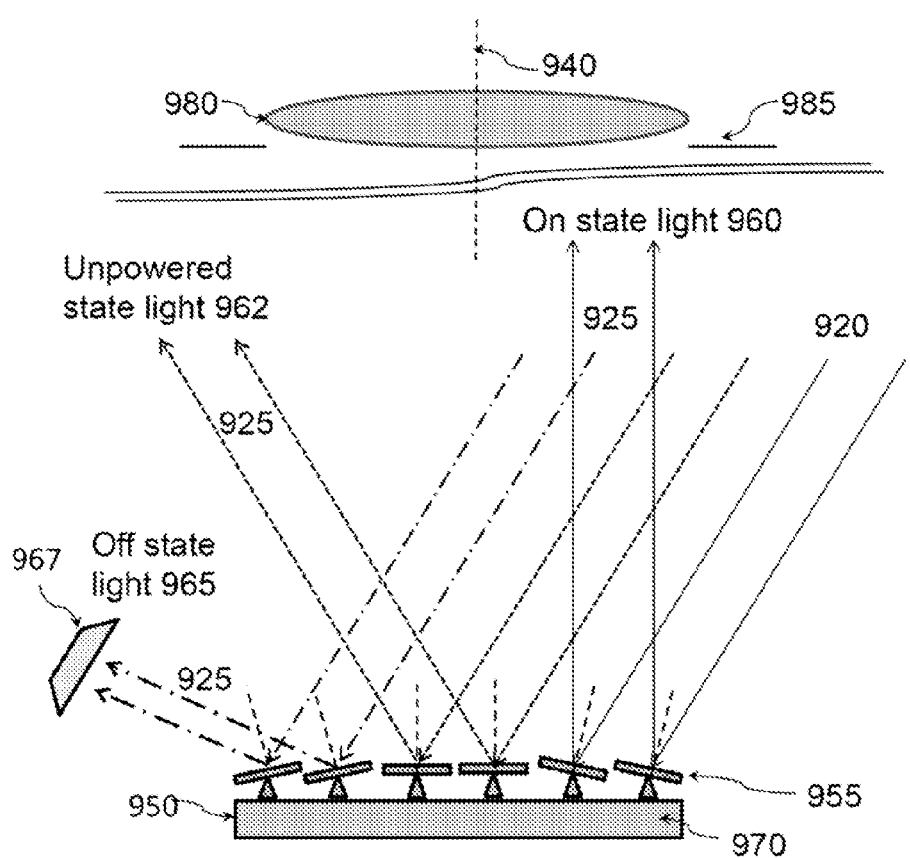
FIG. 8 depicts aspects of light reflection and diffraction from a DMD micro-mirror array according to one feature.

Operation of the DMD optical modulator device is depicted in FIG. 8. An incident light beam 920 can interact with a micro-mirror array 950 that includes micro-mirrors 955 formed on a substrate 970. The substrate 970 can be a silicon wafer patterned with both electronics and the micro-electro-mechanical substructure (e.g., a hinge) that causes a given micro-mirror 955 (or pixel) to controllably tilt when a signal is applied. FIG. 8 also depicts the micro-mirrors 955 in three different states: the "ON State" 960, the "OFF state" 965, and an unpowered state 962. Incident light can reflect off of the front surfaces of the micro-mirrors 955, nominally, such that the angle of reflection from the surface normal equals the angle of incidence. For micro-mirrors 955 in the unpowered state 962, the emergent light beam 925 can appear to reflect nominally as if it reflected from a plane mirror parallel to the front surface of the substrate 970. In a working projector, incident light may be seldom applied to a micro-mirror array in the unpowered state 962. For micro-mirrors 955 in the ON state 960, incident light can be redirected to provide an emergent light beam 925 corresponding to ON state light or image light, which can transit to an optic 980 that has an aperture 985 and an optical axis 940. Optic 980 can be an optical element having a limiting aperture, which can be a lens or lens assembly (e.g., a projection lens). For micro-mirrors 955 in the OFF state 965, incident light can be redirected as an emergent light beam 925 for OFF state light, which can be captured and absorbed by a beam dump 967. Image data can be encoded into the light emergent from the micro-mirror array 950, depending on the pattern of micro-mirrors, which are in the ON or OFF states at a given time. DMD micro-mirror optical modulator devices can be sorted for pixel defects, with devices having fewer pixel defects, and particularly fewer pixel defects in the central portion of the device, being used for green or red imaging channels instead of blue imaging channels.

Early in the development of the DMD device technology, the individual micro-mirrors 955 or pixels were relatively large, at ~30 μm square. Subsequently, device resolution has improved, with progressively smaller pixels, evolving from ~17 μm square in the late 1990's, to 13.8×13.8 μm for the 2K digital cinema projectors (2005), and more recently, reaching 7.5 μm×7.5 μm pixels with the DC4K devices (2011). As the size of the micro-mirrors 955 has decreased, and feature sizes have become smaller, issues such as mirror tilt variation among DMD micro-mirrors 955 in a device has become more significant and harder to control during device manufacture. Also, as micro-mirrors decrease in size, diffraction effects become increasingly important, and the micro-mirror array 950 can be thought of as a programmable blazed grating. As a diffraction grating, diffraction directionality can be modeled by the grating equation, $m\lambda = d(\sin\theta_i \pm \sin\theta_m)$, where m is the diffraction order, d is the grating pitch, $\theta_i$ is the incident angle and $\theta_m$ is the output diffracted light angle. A blazed grating can have the pitch d of a conventional grating, but also tilted surfaces that can direct optical flux into a particular order, increasing the efficiency thereof, while minimizing the residual power to the other orders (particularly the zeroth). For micro-mirrors 955 in the ON state 960, incident light can be nominally redirected as ON state light in the direction dictated by a mirrored reflection, but with the efficiency altered by diffraction. Diffraction effects can cause an efficiency loss versus a plane mirrored surface as some light can directed into other diffracted orders, which the blaze can then partially restores.

In the case of a projector in which an illuminating source has a spectral bandwidth $\Delta\lambda$ in a given color channel, the angular direction $\theta_m$ of the diffracted light can change for a given order m. Typically, a given laser in a color channel can have a spectral bandwidth of 0.1-1 nm, depending on the underlying technology. The ensemble of lasers in a color channel can then combine to provide a narrow overall spectral bandwidth $\Delta\lambda$ that is ~2-7 nm wide. Likewise, as the incident angle $\theta_i$ changes, as can happen if convergent light is directed at the micro-mirror array 950 instead of collimated light, the output diffracted angle $\theta_m$ can also shift. Residual surface roughness of the mirrored surfaces of the micro-mirrors 955 can also affect the directionality of the reflected diffracted ON state 960 or OFF state 962 light. The incident light beam 920 can be introduced to the micro-mirror array 950 at a compound angle, and thus experience a two dimensional diffraction grating structure, such that it can be difficult to predict or model the diffraction behavior accurately.

Figure 9A:
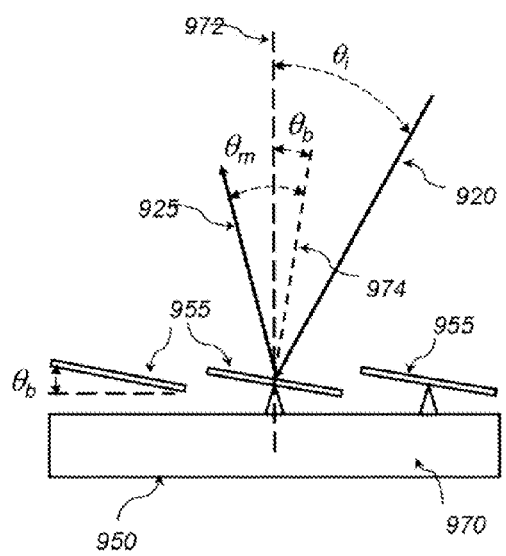
FIGS. 9a and 9b depict the emergence of diffracted orders from a micro-mirror array device according to one feature.
Figure 9B:
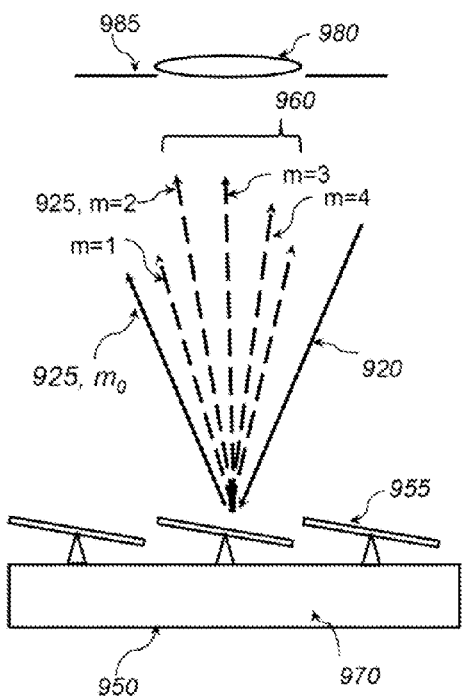

FIGS. 9a-b depict certain aspects of light reflection and diffraction from a portion of a micro-mirror array 950 in greater detail. FIG. 9a provides the geometry of diffraction from a DMD when considered as a blazed diffraction grating. An incident light beam 920 can be incident to micro-mirror array 950 at an angle $\theta_i$ relative to the device normal. A portion of micro-mirrors 955 can be activated to be tilted to the ON state, where the mirror tilt angle (e.g., 12°) is equivalent to a grating blaze angle $\theta_b$. An emergent light beam 925 can leave the micro-mirror array 950 at angle $\theta_m$, where $m\lambda=2d \sin \theta_b * \cos(\theta_i-\theta_b)$. Geometrically, blaze angle $\theta_b$ can be the difference between the device normal 972 and the mirror normal 974. Blazed gratings can be optimized to achieve maximum grating efficiency of diffracted light directed into a given diffraction order. Optically, the blaze angle can be the direction of maximum efficiency for diffracted light that matches the blaze wavelength for which the grating is optimized (or blazed).

FIG. 9b shows a variety of emergent light beams 925 or output diffraction orders (m) that can be produced, including the 0 order beam ($m_0$), which corresponds to the reflected light direction in the unpowered state. FIG. 9b illustrates an example set of six diffraction orders, of which three orders (m=2,3,4) can become a cone of ON-state light 960 that is collected through an aperture 985 of optic 980.

Figure 10:
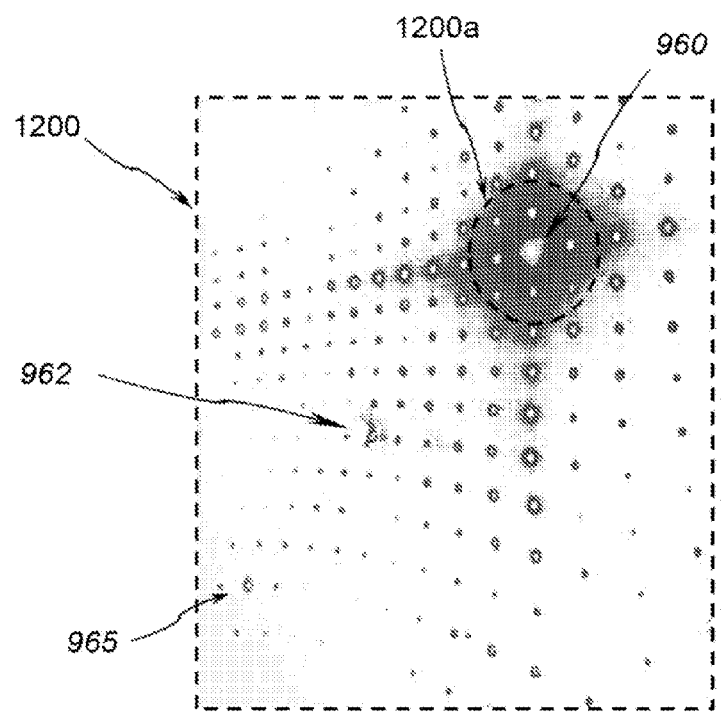
FIG. 10 depicts an example two-dimensional arrangement of diffraction orders coming from a micro-mirror array device according to one feature.

Diffraction from micro-mirror array 950, which can be a mutable two dimensional grating structure, can be much more complicated than in FIG. 9b. Diffraction can occur in two dimensions, instead of in a plane. For example, FIG. 10 depicts an image of a diffraction pattern 1200 that is a two dimensional array of diffraction spots created by directing a collimated laser beam at ON-state pixels of a micro-mirror array 950, generating ON state diffracted light 960, weak unpowered state light 962, weak OFF state light 965, and numerous other diffraction orders. While the position of the diffraction orders can be predicted by the grating equation, the effective ON-state diffracted light 960, representing potentially optically useful and collectable light, can span a larger area (diffraction pattern 1200a) when convergent or divergent light is directed at the device. This potentially collected diffraction pattern 1200a can be much more complicated, as the diffraction efficiency and output direction varies as a function of the wavelength and bandwidth of the incident light ($\Delta\lambda_c$), the variation of incidence angle ($\theta_i$) due to having a convergent beam (e.g., at F/6) focused onto the micro-mirror array 950, the tilt variation and surface quality variation of the micro-mirrors 955, and numerous other factors. As a result, the directionality, efficiency, and aggregate light profile of the diffracted light heading in the general direction of the aperture 985, can be difficult to anticipate. Additionally, both the published theory and experimental data available for blazed diffraction gratings is devoted almost exclusively to a special case: the Littrow configuration, where the blaze angle is chosen such that diffraction angle and incidence angle are identical, and the diffracted beam essentially retro-reflects onto the incident beam. The paper, *Echelle Efficiency and Blaze Characteristics*, by M. Bottema, published in the SPIE Proc. Vol. 240, pp. 171-176, (1980) provides a model for diffraction efficiency of an echelle style blazed grating, but as a deviation from Littrow condition. However, the micro-mirrors 955 are not used in the projector at an orientation close to Littrow condition, and they are much more complicated than a fixed grating structure etched in glass.

Given the difficulties of predicting the details of diffraction from a micro-mirror array 950 as used in a projection system, bench-test experimental measurements of several DMD devices can be performed. As a first example, FIG. 11a depicts a diffraction pattern generated in the ON state with a 4K resolution DMD light illuminated with a convergent F/6 beam of green 543 nm laser light incident to a small portion of the device at a compound incident angle of ~24°. In this case, a left handed diffraction pattern 1210 occurred, with dominant secondary diffraction orders 1235 and tertiary diffraction orders 1240 distributed to the left and downwards from the primary diffracted order 1230, and positioned closer to the diffraction order (zero order) for the unpowered state 962. FIG. 12a depicts an associated cross-sectional diffraction profile 1250 scanned along axis a-a of FIG. 11a and having a pronounced diffraction peak 1255, which can be ~±5° wide, and a diffraction tail 1260 that trails off to the left side. As a second example, FIG. 11b depicts a diffraction pattern, and FIG. 12b depicts the associated diffraction profile 1250, for an F/6 beam of green 543 nm laser light incident to a second 4K resolution DMD device. In this second case, a right handed diffraction pattern 1220 occurred, with dominant secondary diffraction orders 1235 and tertiary diffraction orders 1240 distributed to the right and upwards from the primary diffracted order 1230, and oriented away from the diffraction order for the unpowered state 962. The diffraction handedness can be a visual or spatial description of the arrangement of the diffraction orders in a plane, although the aggregation of the on-state orders can describe a complex shaped beam or cone of light propagating away from the modulator. The images of FIGS. 11a-b are converted to gray scale from color images, and the apparent density on paper may not accurately indicate the actual light intensity.

Relative to the diffraction pattern 1200 of FIG. 10, the left handed diffraction profile 1210 and the right handed diffraction profile 1220 are example portions (1200a) of the diffraction pattern 1200 and can be collectable for imaging experienced for the ON-state 960 with convergent incident light instead of collimated light. In the context of FIG. 10, a left handed diffraction pattern 1210 can have secondary and tertiary diffraction orders closer to the unpowered state 962, and a right handed diffraction pattern 1220 can have secondary and tertiary diffraction orders further away from the unpowered state 962.

Figure 13:
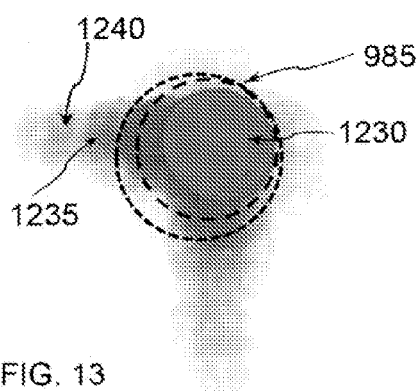
FIG. 13 depicts an example on-state diffraction pattern overlaid with exemplary optical apertures according to one feature.
Figure 14A:
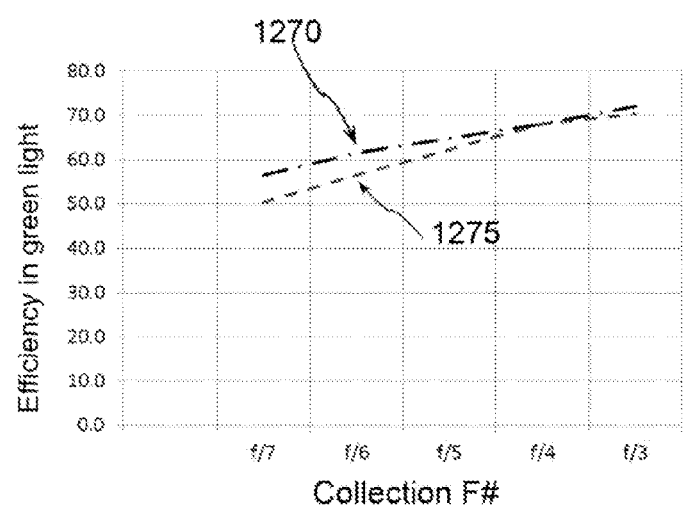
FIGS. 14a-d depict graphs of collection efficiency or contrast according to certain features.
Figure 14B:
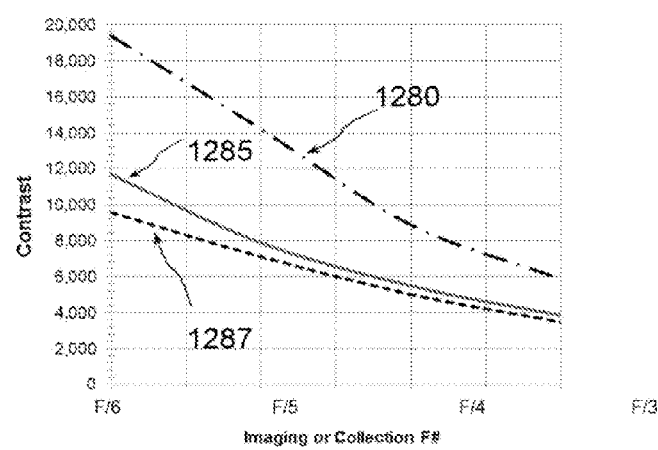

FIG. 13 depicts an example green left handed diffraction pattern 1210 of FIG. 11a overlaid with two optical apertures 985. The green left handed diffraction pattern 1210 of FIG. 11a can represent a complex beam or cone of light that is expanding out from the micro-mirror array surface and hitting a plane where the aperture 985 resides, where some light is transmitted, and other light is blocked. A small optical aperture can have a radius that supports an f-number (or F#, e.g., F/6) or numerical aperture (NA) that nominally allows only the primary diffraction order 1230 into the downstream collection optics 980 (e.g., projection optic 112). Alternately, it can have a size that supports a smaller f-number (e.g., F/3) or larger NA for which at least portions of the secondary diffracted order 1235 and portions of higher diffracted orders (e.g., tertiary diffracted order 1240) are collected into an optical aperture 985. FIG. 14a, which depicts an example of light collection efficiency vs. f-number for green laser light testing of the device providing the FIG. 11a left handed diffraction pattern 1210, shows that the light collection efficiency (left handed efficiency 1270) to the collection aperture 985 increases as the f-number decreases. This efficiency measurement can be accomplished by holding the illumination F-number at a constant F/6, and varying the collection f-number. Similarly, FIG. 14b depicts example data for left handed contrast 1280 in green light, demonstrating that the contrast for leakage of light into the collection aperture 985 when the device is in the OFF state increases as the f-number increases. A larger f-number can provide better contrast, but less collection efficiency, to the aperture 985.

Efficiency and contrast can be examined for micro-mirror arrays 950 providing green left or right handed diffraction patterns 1220. For example, FIG. 14a depicts an example of efficiency versus F-number for green laser light testing of the device providing the FIG. 11b right handed diffraction pattern 1220, which shows that green laser light collection efficiency increases as the collection F# decreases (corresponding to a larger aperture 985). The left handed collection efficiency 1270 of ~62% at F/6 for the left handed diffraction pattern 1210 can be larger than the right handed diffraction efficiency 1275 of ~57% for right handed diffraction pattern 1220. Generally, this difference can hold for larger F-numbers (smaller apertures 985), although the two curves can converge to the nearly identical efficiency (~71%) for an F/3 aperture. Efficiencies for F/6 collection of diffracted F/6 green illumination light can range between 56-65%.

With respect to FIG. 14b, right handed contrast 1285 from the OFF state leakage for the device having right, green-handed diffraction pattern 1220 of FIG. 11b also increases for larger F-numbers, but the contrast is lower than experienced with the left handed case (1280). In either case, optimizing f-number for light efficiency (e.g. at F/3) can reduce contrast with a round aperture 985, and optimizing f-number for contrast (e.g. at F/6) can reduce efficiency.

For a sample set of DMD micro-mirror arrays 950, the number of left handed diffracting or right handed diffracting devices can be about equal, but with left handed devices in green light exhibiting higher collection efficiencies and higher contrast results than right handed devices in green light. 4K DMD micro-mirror array optical modulators can be tested and sorted for green light performance, where devices exhibiting left handed diffraction can provide significantly higher efficiency and contrast.

In the case of a 4K DMD micro-mirror array 950 with a 7.5 μm pixel pitch and incident green light at 543 at a compound incident angle of ~24°, the combination of parameters can substantially fulfill the blaze condition, maximizing light into one order (primary order 1230), with the presence of convergent incident light increasing the spread into other diffraction orders. By comparison, incident red light in the 630-640 nm range to the 4K DMD devices is not at blaze condition, and more light may be distributed outside the primary diffraction order 1220 than was seen with green light.

Figure 11C:
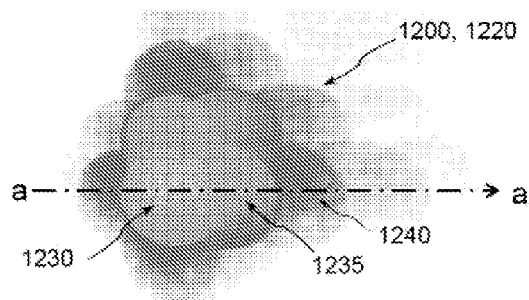
Figure 11D:
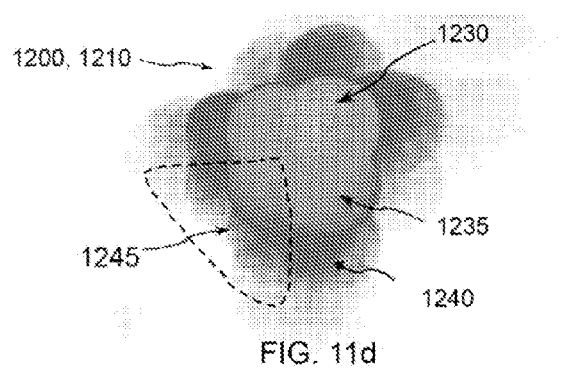
Figure 12C:
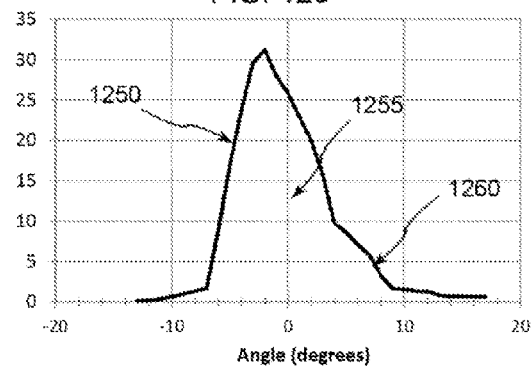
Figure 12D:
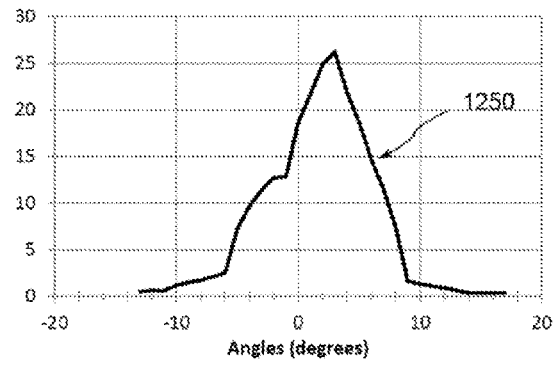

In particular, devices in the sample set of 4K DMD micro-mirror arrays 950 can be tested for diffraction, light collection, and contrast performance when exposed to green, red, or blue laser light. FIG. 11c depicts a diffraction pattern generated in the ON state with a 4K resolution DMD light illuminated with a convergent F/6 beam of red 632 nm laser light incident to a small portion of the device at a compound incident angle of ~24°. In this case, a right handed diffraction pattern 1220 can occur, with dominant secondary diffraction orders 1235 and tertiary diffraction orders 1240 distributed to the right and upwards from the primary diffracted order 1230. FIG. 12c depicts an associated cross-sectional diffraction profile 1250, scanned along axis a-a of FIG. 11c, in which the both the diffraction peak 1255 and the diffraction tails 1260 are much broader than seen in green light. As a second example for an F/6 beam of incident red 632 nm laser light, FIG. 11d depicts a diffraction pattern, and FIG. 12d depicts the associated diffraction profile 1250 for a different micro-mirror array 950. In this second case, a left handed diffraction pattern 1210 occurs, with dominant secondary diffraction orders 1235 and tertiary diffraction orders 1240 distributed to the left and downwards from the primary diffracted order 1230. The red diffraction patterns of FIGS. 11c-d can be larger and more complicated than the green diffraction patterns of FIGS. 11a-b, because, proportionally, more light may be present in the secondary diffraction orders 1235 and the tertiary diffraction orders 1240, and more light can be present in the cross orders 1245 to provide a "messy" diffraction pattern compared to the cleaner ones of FIGS. 11a-b.

Figure 14C:
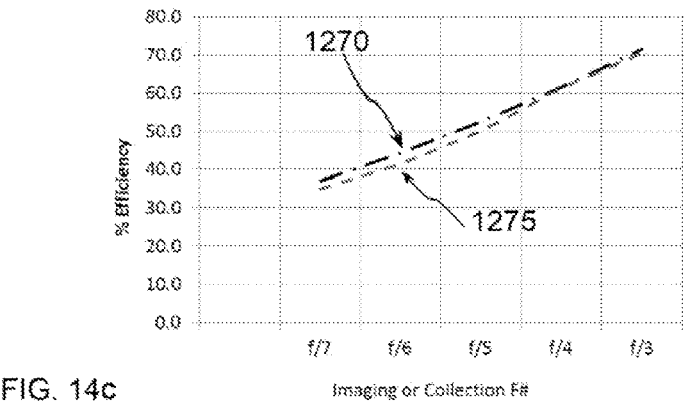

As with the green laser light testing, both collection efficiency and contrast for OFF state leakage and incident convergent red laser light with different sized apertures 985 can be equivalent to different F-numbers in the F/6 to F/3 range. FIG. 14c depicts an example of collection efficiency versus F-number, and shows a device exhibiting red right handed diffraction having right handed collection efficiency 1270 that is higher (~44%) than a device exhibiting red left handed diffraction with left handed collection efficiency 1275 (~41% efficiency) at large f-numbers (e.g. F/6). As with green laser light testing, both the left handed and right handed curves can converge to the same approximate efficiency (~70%) at F/3. For the overall group of devices, the efficiency results for F/6 collection of F/6 diffracted illumination red laser light can be lower (39-47%) than seen in green light. Red right handed devices can have higher light efficiency than red right handed devices, although the two groups may be close enough to somewhat overlapping in the range of efficiencies seen at F/6.

An example curve of contrast for a micro-mirror array that is left handed in red light is depicted in FIG. 14b as left handed red contrast 1287. In red light, as in green light, contrast increases as the f-number increases, although red light contrast may be generally lower than green light contrast. Devices providing red right handed diffraction may have higher red light contrast than devices having red left handed diffraction. Although FIG. 14b does not show a red right handed contrast curve, red right handed contrast may meet or exceed the green right handed contrast 1285 shown in FIG. 14b. Micro-mirror array devices that provide right handed diffraction in red light may exhibit both higher light efficiency and higher contrast than devices which provide left handed diffraction in red light. The differences may be small, and the groups may overlap, with some red left handed devices having higher contrast and efficiency than some red right handed devices. Micro-mirror array devices that are left handed in green at 543 nm, may be right handed in red at 632 nm, such that given devices that perform the best, tend to do so for both green and red. While this can create a device selection conflict, the left handed to right handed differences may be more distinct in green light, but less distinct in red light, suggesting that there can be greater latitude in selecting devices for red light use.

Figures 11E, 11F:
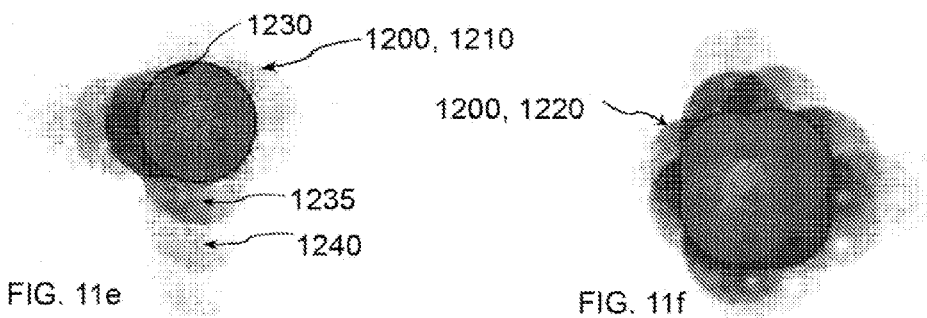
Figure 12E:
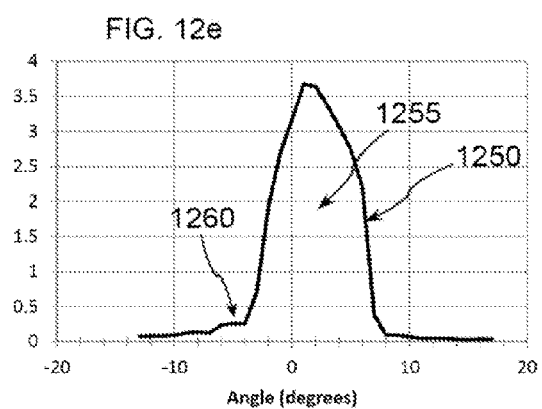
Figure 12F:
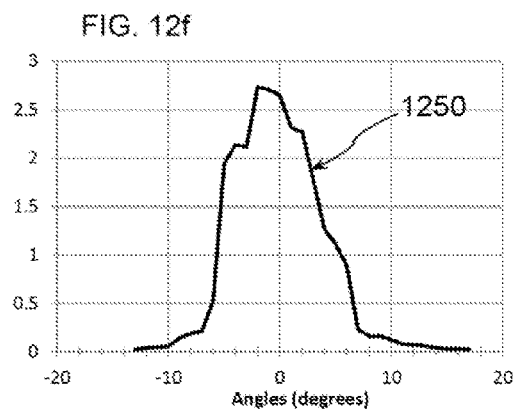
Figure 14D:

The same group of DMD micro-mirror arrays 950 can be tested by exposure to blue 464 nm laser light. As shown in FIGS. 11*e* and 12*e*, left handed diffraction patterns 1210 and diffraction profiles 1250 seen in blue laser light may be similar to the diffraction patterns seen in green laser light (FIGS. 11*a* and 12*a*). However, FIGS. 11*f* and 12*f* depict a blue light right handed diffraction pattern 1220 and diffraction profile 1250 similar to those seen in red light. These similarities are reflected in FIG. 14*d*, where collection efficiency maps strongly with the blue handedness, where blue left handed devices have an F/6 left handed collection efficiency 1270 for diffracted blue F/6 illumination light of ~62% which is similar to green left handed devices, while blue right handed devices have a right handed collection efficiency 1275 of only ~45%, which is similar to red right handed devices. The micro-mirror arrays 950 that did not exhibit blue light left handedness, but instead exhibited blue light right handedness, may exhibit a greater range of diffracted light distribution than seen in either red or green light. In particular, devices that are not distinctly blue light left handed, may be blue light right handed as depicted in FIG. 11*f*, or may have an intermediate handedness where the arrangement of diffraction orders provides nearly symmetrical diffracted light distributions (at least along two axes).

Although a curve for blue contrast is not shown in FIG. 14*b*, devices having blue left handedness may also have higher contrast (~1.5x) than devices having blue right handedness; however, the best blue light contrast may be lower than that achieved in either red or green light. While this may not be desirable, and may or may not occur in an actual projector, the human eye is less sensitive to blue light contrast than red or green light contrast, and the differences may be acceptable.

The micro-mirror arrays 950 that are left handed for blue laser light, and have the best blue light efficiency performance, may be the same devices that are right handed in green and have the poorest green light efficiency performance. Although left handed diffracting micro-mirror array devices may be favored in both green light and blue light, the two sets can be mutually exclusive and not competing for the same devices. By comparison, as handedness favoritism in red seems weak, other selection criteria for red devices (e.g., pixel defects) may have greater priority.

As suggested above, left or right diffraction handedness, collection efficiency, and contrast can be wavelength dependent in varying device exposure with red (632 nm), green (543 nm), or blue (464 nm) light. Handedness can vary within a color. For example, devices in blue light at 448 nm, similar collection efficiencies can be obtained at 448 nm as at 464 nm for the same devices, but the diffraction handedness can switch, with devices giving left handed diffraction at 464 nm with higher efficiency, being the right handed diffraction devices at 448 nm that can also have higher efficiency over other devices. If the color channels are non-overlapping, a spectral separation between these test sources can be $\Delta\lambda_s$~18 nm. If the two sources have spectral bandwidths ($\Delta\lambda_c$) large enough to significantly span this separation bandwidth, then both diffraction handednesses may appear and simultaneously and significantly wash each other out. This can complicate, but not necessarily negate, the value of color dependent apertures.

Figure 5B:
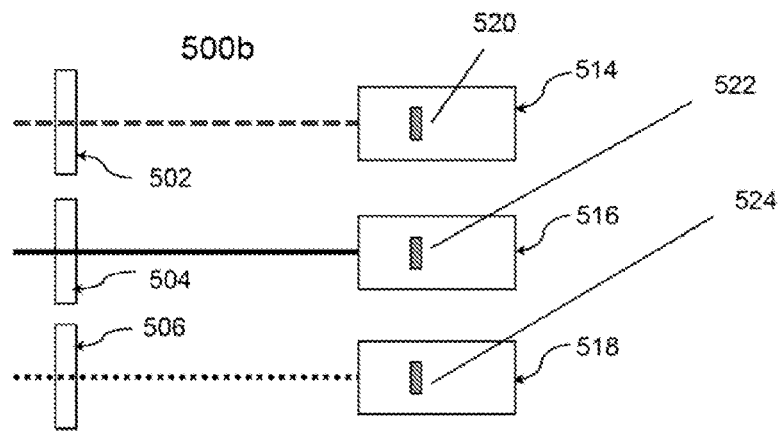

As another example, diffraction handedness can be examined for an alternate red laser wavelength: 664 nm instead of 632 nm. A large spectral separation between wavelengths ($\Delta\lambda_s$=32 nm) can provide a different handedness within a color. In this case, the tested micro-mirror arrays 950 can exhibit red right handed diffraction, but some devices may provide a messy left handed diffraction pattern (similar to FIG. 5*c*), while other devices may provide a cleaner right handed diffraction profiles (similar to FIG. 5*b*) with the diagonal orders muted. Devices which provide a messy right handed profile at 632 nm (like FIG. 5*d*) may be the devices with the cleaner diffraction profile at 664 nm.

The diffraction handedness for a device may also not change with varying incidence angle, although tweaks of illumination incidence angle can modify the directionality of the diffracted light. Whether the incident light is focused onto the micro-mirror surfaces, or before or after those surfaces, can also have little effect on the handedness or efficiency. Diffraction handedness may not depend on the polarization of the incident light, although collection efficiency can be polarization dependent.

As system light efficiency and contrast can depend on the diffraction handedness, and handedness can vary with the incident spectral bandwidth, a process can be implemented to test and sort devices. A convergent beam of light having the nominal illumination f-number can be directed at a portion of the micro-mirror array 950. The beam can be focused to illuminate an area representing 1 mm$^2$ or less, or at most several thousand pixels. The resulting arrangement of diffraction orders can then be classified as left handed, right handed, intermediate, or other, either visually or using a machine vision system. Potentially, each device can be tested at each nominal wavelength for each color channel or to provide more detailed data thereof. In a three primary system, such as shown in FIG. 5*a*, such testing may be manageable, but in the case of a six primary (6P) stereo system, a lot of testing can be required, as each eye may receive a unique wavelength set (e.g. $R_1G_1B_1$ and $R_2G_2B_2$).

Alternately, this example method can be used to statistically correlate different usage spectra with both diffraction handedness and average device micro-mirror tilt, and then devices can be at least initially sorted using measured mirror tilt data. Diffraction handedness may have some correlations. For example, a device which tested left handed in green at 543 nm, can be left handed in blue at 464 nm or right handed in red at 632 nm or right handed in blue at 448 nm. Alternately, as with the 664 nm test, handedness can be constant, but the diffraction pattern can vary on per device basis relative to the strength of the cross orders. As a result, a single test with a single laser color may determine handedness for a range of illumination wavelength situations, and enable a large portion of devices to be quickly sorted for use. A device which tested right handed in green at 543 nm, can produce a wider range of diffraction handedness responses in other wavelengths. This type of testing to sort devices for diffraction handedness can also include quick measurements of light collection efficiency and contrast to provide further characteristic data.

As another complimentary approach to potentially quickly sorting devices for diffraction handedness, in the case of DMD micro-mirror arrays, diffraction handedness may correlate with the average mirror tilt across the device. For example, devices with average micro-mirror tilts of ~11.8° may provide left handed diffraction patterns for green at 543 nm, or right handed diffraction patterns for red at 632 nm, and provide advantaged efficiency and contrast results compared to devices that gave right handed diffraction patterns for green at 543 nm, or left handed diffraction patterns for red at 632 nm. These latter devices, which can provide inferior results at 543 nm and 632 nm, and which may have average micro-mirror tilts of ~12.7°, can be the same devices which at 464 nm are left handed and can provide superior efficiency and contrast results. If diffraction handedness is determined by testing in advance for a particular wavelength or spectral bandwidth using a statistically valid sampling of devices, DMD micro-mirrors can subsequently be sorted based on measured mirror tilt angles, with different average mirror tilt angles being preferred for different spectra. Devices with intermediate mirror tilts (~12.3°-12.4° may also prove advantaged for certain spectra. Average mirror tilt may be more important than absolute mirror tilt variation with a device, as 4K DMD devices having average mirror tilt variations of ±0.05° to ±0.20° may not suffer significant handedness variations across the device and may provide uniform high efficiencies across the device. Some DMD micro-mirror arrays can suffer large peak mirror tilt variations of ~1.0°.

In considering the efficiency graphs of FIGS. 14a,c,d, peak efficiency is seen near F/3, regardless of the exposing wavelength, red, green, or blue, or the diffraction handedness experienced for that wavelength. Moreover, at F/3, peak efficiency for all wavelengths may converge to a similar narrow range (~69-72%) despite the wide range of efficiency measurements seen at higher f-numbers. In considering the contrast curves of FIG. 14b, peak contrast is experienced at high f-numbers (e.g., F/6). This trend may be true for either left or right handed devices, although the actual contrast numbers achieved can vary over a much larger range than the converged peak collection efficiencies do. In the latter case, a small amount of stray light can make a difference in contrast measurements, making the results sensitive to baffling and measurement noise. Determination of the light collection F-number can depend on whether collection efficiency or image contrast has greater priority, or a balanced priority may drive an intermediate value (e.g., F/4.5). The determination of an optimal aperture 985 in an optical system using a micro-mirror array 950 whose operation is significantly complicated by diffraction, can be determined by other factors, such as optimizing projection lens MTF or reducing the impact of efficiency variations across a micro-mirror array device.

Alternately, a larger optical aperture 985, having a smaller f-number, for example in the F/3.5-F/4 range, can become more acceptable if a color dependent aperture is used to enhance contrast. Previously, in FIG. 7, a CDA 700 having a complex shape has example regions 704 or 706 that can transmit or block portions of diffracted light in specific spectral bands. This approach can be extended to the example DMD diffraction patterns seen in FIGS. 11a-f. The definition and location of the collection aperture 985, and particularly a color dependent aperture, can determine what portion of the diffracted light is optically useful, in terms of which light will be used for imaging (projection) and which light is rejected (blocked) to reduce stray light and provide image contrast.

In particular, FIG. 15a shows an example CDA 800 applied to the exemplary green left handed diffraction pattern 1210 shown in FIG. 11a. Light blocking elements 805 and 810 can be applied strategically around the edges of the aperture 985 to block stray light or light from unwanted diffraction orders, including residual light from cross orders 1245. While these blocking elements may marginally reduce transmitted light in the ON-state, the small amount of light blocked in the dark or OFF state can improve contrast or the perception of blackness in the appropriate portions of the projected onscreen image. If only green light is to be blocked in the optical system, then blocking elements 805 and 810 can be opaque, although different designs can be used if a green light right handed diffraction micro-mirror array is used instead. For example, considering FIG. 11b, the corner light blocking element 805 can be needed in the diagonally opposite location. In this case, because symmetry is maintained, the same arrangement of blocking elements 805 and 810 used for a green left handed diffracting device can be rotated 180° about the optical center and used for a green right handed diffracting device. This example assumes the use of green 543 nm light. If a different green laser light is used, such as at 532 nm or 565 nm, then the handedness and CDA blocking may be different than with green 543 nm light.

In considering the example blue left handed diffraction pattern 1210 of FIG. 11e, which has the same orientation as the green left handed diffraction pattern 1210 of FIG. 11a, the example CDA 800 of FIG. 15a can be used to block stray light for both green and blue channels to improve contrast therein. If the blue and green diffraction patterns are sufficiently alike, the blocking elements 805 and 810 can be opaque to both spectra. However, in considering the associated cross-sectional diffraction profiles 1250 of FIGS. 12a and 12e, the two diffraction peaks 1255 may be nearly the same size, but the diffraction tails 1260 may not be identical. The two color channels may use an aperture 985 having the same size (e.g., F/4.5), but then different stray light blocking for the two colors. For example, one or more additional blocking elements 815 can be added to the CDA 800, which block blue light but transmit green light, as blue light tends to have less contrast into the collection aperture 985 and can benefit from additional baffling. This example blocking element 815 can be a dichroic filter or a light absorptive filter that at least blocks blue light and at least transmits green light of the appropriate spectra. The size (e.g., in inches) and shape of these light blocking elements can be tailored to the physical size of the diffracted light within the collection aperture 985.

Figure 15B:
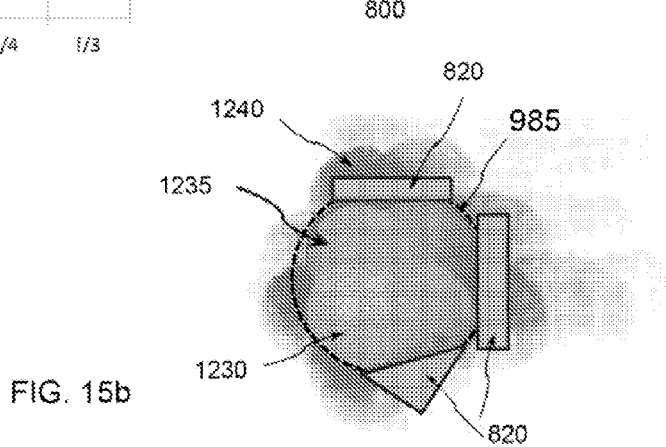

In the case of micro-mirror/illumination wavelength combinations that give messy diffraction patterns, such as the example blue right handed diffraction pattern 1220 of FIG. 11f, or the red left and right handed diffraction patterns of FIGS. 11c,d, providing blocking regions within color dependent apertures can be more difficult, as light blockage for stray light can also have significant impact on transmission. In such cases, as depicted in FIG. 15b, it can be desirable to provide a larger aperture (e.g., F/3.5) and then add appropriate light blocking elements 820. If, for example, these light blocking elements are intended to improve red contrast and they are entirely outside the aperture circumscribed by green and blue light, then these elements can be opaque. But if these red blocking elements 820 overlay regions intended to transmit green or blue light, then the light blocking may need to be spectrally selective. However, it can be more likely that the larger aperture required for red light means that one or more of the light blocking regions 805, 810, and 820 shown in FIG. 15a may be used to transmit red light while blocking green and/or blue light. The light blocking elements can then be dichroic filters or light absorptive filters that at least block blue light or green light, while transmitting red light.

Color dependent apertures can be tailored to the available selection of diffraction handednesses found among the tested devices in the different spectral bands. For example, a CDA for an optical system having a green left handed diffracting device, a blue left handed diffracting device, and a red right handed diffracting device can be structured differently than a CDA for an optical system having a green right handed diffracting device, a blue left handed diffracting device, and a red left handed diffracting device. This customization can be a problem, as there can be at least twenty-seven possible combinations. In the case of dichroic filters, which may be made as optical thin film coatings on glass substrates, a limited number of CDA filter configurations can be supported and the spectral diffraction handednesses of the modulators to the CDAs can be matched. This can be manageable as device handedness can change depending on wavelength (including color), enabling devices to be flexibly sorted to match the reduced set of CDA filter configurations. Alternately, CDA filter configuration flexibility can be increased if the CDA filters can be pattern printed on an optical substrate, which is quite possible with light absorbing filters using dyes or pigments.

The example aperture 985 or CDA of FIG. 15a can have accompanying light blocking elements 805, 810 and 815 which create a complex aperture shape, which can transmit light beams or cones with complex contour that can vary spectrally. An aperture 985 can also have a simpler shape, and be round, as depicted in FIG. 13. In that case the aperture can be sized to let a portion of the largest spectral beam through (such as light beams for the red diffraction patterns of FIGS. 11c,d), while light beams suffering less diffraction spreading (e.g., light beams for green diffraction patterns of FIGS. 11a,b) underfill the aperture 985. In the latter case, the aperture can be under-filled non-uniformly, providing a non-uniform f-number that is a different effective f-number than experienced by the first (red) spectra. Whether a light beam under-fills an aperture, or light blocking elements, including color dependent light blocking elements are used, the resulting f-number for a spectral beam may not be simply described. Thus, for any diffracted spectral bandwidth, it can be appropriate to reference a maximum f-number, a minimum f-number, an average f-number, a weighted average f-number, or a working f-number. Then, for example, the average f-numbers can vary for different color channels based on the micro-mirror array used, and the diffraction handedness and diffraction profile provided by that device for the spectra used.

Although the example projector shown in FIG. 5a is a three chip system, having red, green, and blue spatial light modulators 150 or micro-mirror arrays 50, aspects can be used with other projector architectures. For example, in the case of a single chip, color sequential projector, the modulator device can be characterized for diffraction handedness for the three relevant spectral bandwidths, and the color dependent aperture or the illumination beams can be optimized for the diffraction characteristics of a particular color. Although the light sources have been described as lasers, other narrowband spectra light sources, such as filtered LED light sources or super-luminescent diodes (SLEDs), can be used. Although the light sources have been described as visible light sources, non-visible light sources, whether ultraviolet or infrared, can also be used. A "narrow" spectral bandwidth in these other spectral ranges can be different than a narrow spectral bandwidth in the visible spectral range.

The color dependent aperture, and the use thereof in conjunction with micro-mirror array devices having a partially diffractive response, has been directed at use in optical projection systems. However, the optical system, including the color dependent apertures tailored to the diffraction handedness, can be optically useful for other applications, including for example, medical imaging devices. As another aspect, although the methods have been applied to micro-mirror arrays, and specifically to DMD micro-mirror array optical modulators, in principle, the approach can be used with other spatial light modulator technologies for projection and other purposes. As laser light is increasingly used in imaging systems having spatial light modulators, and the pixel and sub-pixel features of these modulator devices become increasingly smaller, optical diffraction can have an increasing impact. In circumstances where diffraction pattern differences among devices and spectral bands occur, such as handedness, or equivalents thereof, the color dependent aperture approach can again be applied.

In each of the examples and explanations provided there are a number of situations in which the design of an optical system can be functionally optimized by using a CDA. For example, if CDA 200 can be used in a projection lens where the working f-number of red light is defined to be smaller than the working f-number of green and blue light. This may produce a better design than for allowing all three colors of light (i.e. RGB) to be at the lower working f-number. It may also be possible to retrofit a previously designed system with a CDA and still benefit. For example a previously designed projection lens with a normal aperture stop could be changed by using a CDA instead of the normal aperture stop. The stop size could be increased (i.e. f-number decreased) for red light only, which can increase red light transmission. The lens aberrations for red light may also increase, but this could be considered an acceptable trade off. Thus it may be possible for an optical system to benefit from using a CDA as a stand alone drop in device even though the system was not explicitly designed to have a CDA.

The foregoing description of features, including illustrated features, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. An optical system, comprising:
a first illumination source for providing a first light beam having a first spectral bandwidth;
a second illumination source for providing a second light beam having a second spectral bandwidth;
a first micro-mirror array optical modulator for selectively modulating the first light beam to encode data thereon;
a second micro-mirror array optical modulator for selectively modulating the second incident light beam to encode data thereon, wherein each of the first micro-mirror array optical modulator and the second micro-mirror array optical modulator (a) is configurable in an ON-state, an OFF-state, and an unpowered state and (b) is adapted for redirecting light by both diffraction and reflection and for providing an output modulated light beam comprising a primary diffraction order in an ON-state and exhibiting a diffraction handedness dependent at least upon the spectral bandwidth of the light incident thereupon, the diffraction handedness being defined by a relative arrangement of at least the primary diffraction order and dominant secondary orders of the ON-state relative to the unpowered state zero order; and
an optical element for collecting the output modulated light beams from both the first micro-mirror array optical modulator and the second micro-mirror array optical modulator, the optical element having at least one color dependent aperture that defines portions of the output modulated light beams which are transmitted and remaining portions which are blocked, wherein the color dependent aperture has a size and a shape that are based on the diffraction handedness of at least one of the first micro-mirror array optical modulators for the associated spectral bandwidth.

2. The optical system of claim 1, wherein a characteristic diffraction handedness for a given micro-mirror array optical modulator is configured to be determined at least in part on a measured micro-mirror tilt for that device.

3. The optical system of claim 2, wherein the characteristic diffraction handedness for a given micro-mirror array optical modulator is determined at least in part based on a measured average micro-mirror tilt for an optical modulator.

4. The optical system of claim 1, wherein the diffraction handedness for a given micro-mirror array optical modulator is left handed, right handed, or intermediate handedness between left handed and right handed.

5. The optical system of claim 1, wherein at least one of the first micro-mirror array optical modulator or the second micro-mirror array optical modulator is configured to be tested to determine the diffraction handedness for one or more spectral bandwidths.

6. The optical system of claim 5, wherein the first micro-mirror array optical modulator and the second micro-mirror array optical modulator are configured to be tested by directing incident light having a selected spectral bandwidth at a modulator device and characterizing the arrangement of diffraction orders relative to the unpowered state zero order.

7. The optical system of claim 1, wherein each of the first micro-mirror array optical modulator and the second micro-mirror array optical modulator is matched with the color dependent aperture based on the diffraction handedness and the configuration of light blocking and light transmitting portions of the aperture.

8. The optical system of claim 1, wherein the first illuminator source and the second illumination source are adapted to provide visible light and to have a narrow spectra bandwidth $\leq 7$ nm.

9. The optical system of claim 1, wherein the shape and the size of the light blocking portions of the color dependent aperture are configured to be tailored to block light at the edges of a primary diffraction order and at least one adjacent secondary diffraction order, for at least one of the first micro-mirror array optical modulator or the second micro-mirror array optical modulator.

10. The optical system of claim 9, wherein the size or shape of the color dependent aperture is determinable based upon system light efficiency, contrast, image quality, modulation transfer function, or efficiency variability across the micro-mirror array optical modulator.

11. The optical system of claim 1, wherein the first and second spectral bandwidths do not overlap.

12. The optical system of claim 1, wherein at least one of the first micro-mirror array optical modulator or the second micro-mirror array optical modulator is a DMD device.

13. The optical system of claim 1, wherein the color dependent aperture is configured to receive two different bands of wavelengths of light, each with a different average f-number such that the color dependent aperture is adapted to have a first average f-number that matches the average f-number of one band of wavelength of light and a second average f-number that matches the average f-number of the other band of wavelength of light.

14. The optical system of claim 1, wherein the color dependent aperture includes multi-layer dielectric coatings, light absorptive dyes or pigments, opaque surfaces, or combinations thereof.

15. The optical system of claim 1, wherein the color dependent aperture is not round.

16. The optical system of claim 1, wherein the color dependent aperture has a middle portion removed for maximum transmission.

17. The optical system of claim 1, wherein the color dependent aperture has three or more regions to match the working f-number of three or more bands of wavelengths of light.

18. The optical system of claim 1, wherein the color dependent aperture is adapted for reducing a working f-number for at least one spectral band of wavelengths of light.

19. The optical system of claim 1, wherein the color dependent aperture is adapted for increasing a working f-number for at least one band of wavelengths of light.

20. The optical system of claim 1, wherein the first micro-mirror array optical modulator is selectable to provide the diffraction handedness that prioritizes ON-state light efficiency for the first beam of light and the second micro-mirror array optical modulator is selected to have the diffraction handedness that prioritizes OFF-state optical contrast for the second beam of light.

21. The optical system of claim 1, wherein at least one of the first micro-mirror array optical modulator or the second micro-mirror array optical modulator is configured to be tested to a peak contrast or a peak efficiency for one or more spectral bandwidths.

22. A method for an optical system, the method comprising:
providing, by a first illumination source, a first light beam having a first spectral bandwidth;
providing, by a second illumination source, a second light beam having a second spectral bandwidth;
modulating the first light beam by a first micro-mirror array optical modulator to encode data on the first light beam and modulating the second light beam by a second micro-mirror array optical modulator to encode data on the second light beam;
redirecting light by each of the first micro-mirror array optical modulator and the second micro-mirror array optical modulator operating among an ON-state, an OFF-state, and an unpowered state to provide an output modulated light beam comprising a primary diffraction order in an ON-state and exhibiting a diffraction handedness dependent at least on the spectral bandwidth of the light incident thereupon, and (b) redirects light by both diffraction and reflection, the diffraction handedness being defined by a relative arrangement of at least the primary diffraction order and dominant secondary orders of the ON-state relative to the unpowered state zero order; and
collecting, by an optical element, output modulated light beams from the first micro-mirror array optical modulator and the second micro-mirror array optical modulator, the optical element having at least one color dependent aperture defining portions of the output modulated light beams that are transmitted and remaining portions that are block, the color dependent aperture being sized and shaped based on the diffraction handedness of a micro-mirror array optical modulator for the associated spectral bandwidth.

23. The method of claim 22, further comprising:
testing at least one micro-mirror array optical modulator among the first micro-mirror array optical modulator and the second micro-mirror array optical modulator by:
directing incident light having a selected spectral bandwidth at the at least one micro-mirror array optical modulator; and
characterizing the diffraction handedness of the at least one micro-mirror array optical modulator; and selecting among the first micro-mirror array optical modulator and the second micro-mirror array optical modulator based on characterizing the diffraction handedness.

24. The method of claim 23, further comprising:
testing a plurality of micro-mirror array optical modulators by determining contrast, efficiency, and diffraction handedness for each modulator of the plurality of micro-mirror array optical modulators for a selection of different spectral bandwidths by use of a plurality of illumination sources;
statistically correlating the plurality of micro-mirror array optical modulators for diffraction handedness and contrast or efficiency relative to tested spectral bandwidths; and
sorting the plurality of micro-mirror array optical modulators for use in the optical system based on statistically correlating the plurality of micro-mirror array optical modulators.

25. The method of claim 22, further comprising:
determining a characteristic diffraction handedness for a given micro-mirror array optical modulator based on a measured micro-mirror tilt for that modulator.

26. The method of claim 22, further comprising:
matching each of the first micro-mirror array optical modulator and the second micro-mirror array optical modulator with the color dependent aperture based on the diffraction handedness and the configuration of light blocking and light transmitting portions of the aperture.

27. The method of claim 22, further comprising:
selecting the first micro-mirror array optical modulator to provide the diffraction handedness that prioritizes ON-state light efficiency for the first beam of light and the second micro-mirror array optical modulator is selected to have the diffraction handedness that prioritizes OFF-state optical contrast for the second beam of light.

* * * * *